Aug. 4, 1931.   G. B. KARELITZ   1,817,567
VIBROMETER
Filed Dec. 27, 1926

WITNESSES:
G. S. Neilson
Flournoy Corey

INVENTOR
George B. Karelitz
BY
A. H. Pendleton
ATTORNEY

Patented Aug. 4, 1931

1,817,567

UNITED STATES PATENT OFFICE

GEORGE B. KARELITZ, OF WILKINSBURG, PENNSYLVANIA

VIBROMETER

Application filed December 27, 1926. Serial No. 157,060.

My invention relates to vibration meters and has particular reference to a device for determining components of vibration of a running machine in any given direction.

An object of my invention is to provide a vibrometer, having a stationary reference body as an integral part, which may be fastened to a running machine to readily determine the degree of vibration of the running machine in any direction.

Another object of my invention is to provide an instrument of the above description which is readily portable, which may be transported without injury to the mechanism thereof and which may be easily and quickly attached to any machine upon which test is to be made.

A further object of my invention is to provide a vibration meter which is simple, rugged and low in cost of manufacture.

It is well-known that when a body or mechanical system has a low frequency of natural oscillation, it is practically undisturbable by high frequency impulses applied to it.

My invention utilizes this principle in providing a stationary reference point from which the degree of vibration of another body may be determined.

My invention may be better understood by reference to the accompanying drawings in which like figures indicate like parts.

Figure 1:
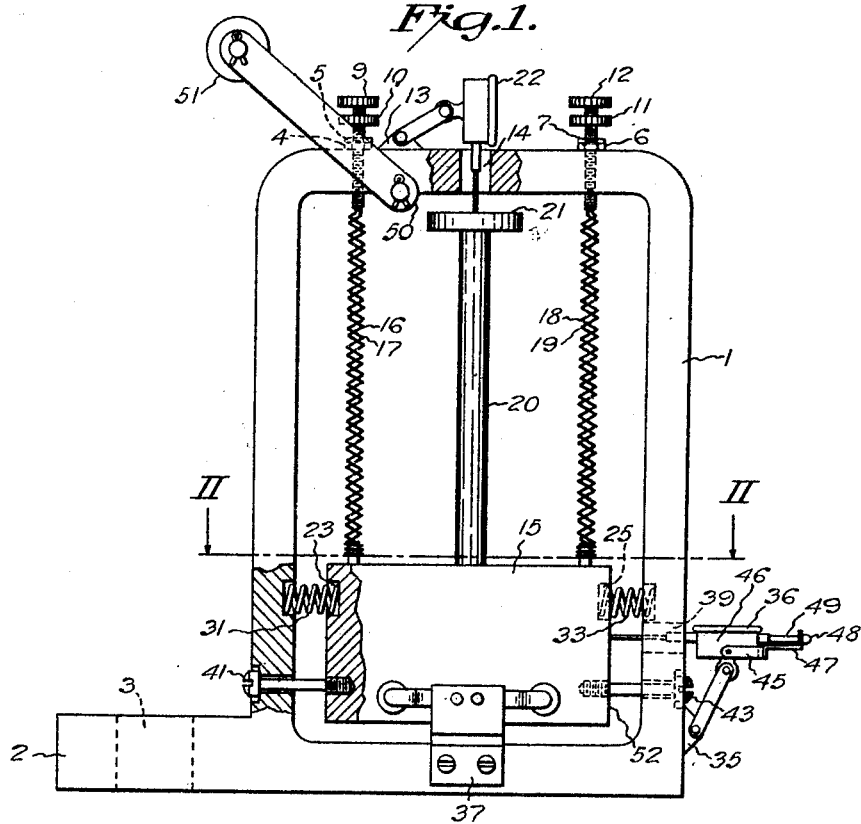
Figure 2:
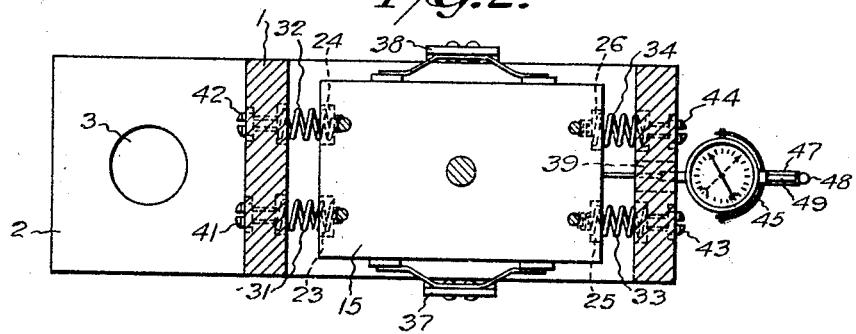

Figure 1 is a front elevational view of my device, with portions thereof broken away to show the construction; and Figure 2 is a top sectional view, taken along the line II—II of Figure 1.

Referring to the figures, my device comprises a rectangular frame member 1. As an integral part of the frame member, a lug 2 having an opening 3 in its center is provided. The vibrometer is mounted on the frame of the machine to be tested by means of this lug.

The upper horizontal portion of the frame member is provided with four tapped openings 4, 5, 6 and 7 placed in rectangular relation. Four adjusting screws 9, 10, 11 and 12 are adapted to fit these openings and are provided with appropriate locking nuts. A lug 13 having means for securing the vertical vibration indicating meter 22 thereto is provided. The indicator used is of the ordinary dial type well-known to the art and it constitutes no part of my invention.

An opening 14 is provided in the center of the upper horizontal portion of the frame member, to permit the plunger of the indicator to project through the frame member. A relatively heavy mass or suspended body 15 is suspended from the adjusting screws by means of four springs 16, 17, 18 and 19. The block 15 is provided with an upwardly extending portion 20 and surface 21 in order to provide a reference point for the vertical vibration indicator. The position of the block may be adjusted and the block leveled by these four adjusting screws.

Four recesses 23, 24, 25 and 26, two on each side of the frame member, are provided on the inner faces of the frame members and corresponding recesses are provided on the block. Four light springs 31, 32, 33 and 34 are adapted to fit in these recesses. The springs are not heavy enough to transmit high vibrational frequencies but they aid in centering the block with relation to the frame member.

A lug 35 provided on the side of the frame member is a mounting for another indicator 36. An opening 39 is provided for the plunger of the indicator and the indicator is adjusted in position so that the plunger rests against the face of the block.

Two vibration dampeners 37 and 38 are attached to the side of the frame member and slidably engage the block to minimize the effect of and readily damp out stray low frequency disturbances.

These dampeners comprise a supporting member attached to the frame and a V-shaped spring member, engaging the block.

The ends of the spring members resting against the block are covered with felt or some friction producing material.

In order to make the vibrometer readily portable it is necessary to provide a locking means in order that the various parts may not be thrown out of adjustment or injured in carrying the meter. This is accomplished by locking the block in place by means of four set screws 41, 42, 43 and 44 positioned in the side portion of the frame member. Recesses are provided in the blocks with which these screws engage. When the screws are screwed into place the block is locked in position.

As the indicators might be subjected to unnecessary wear when the instrument is attached to the machine but is not in use, a locking device is provided for disengaging the plunger of the meter from the face of the block. This locking device is formed of a frame member 45 adapted to fit the casing 46 of the indicator 36. An upstruck portion of the frame member 47 shaped in the form of a U is adapted to engage the button 48 of the indicator plunger 49 and hold the plunger out of engagement with the side wall of the block.

A projection 50 is provided on an inner surface of the horizontal portion of the frame member and a handle 51 is adapted to engage this projection. The projection is so positioned in relation to the mass of the entire instrument that it is in the center of the balance of the mass. The handle is used for transporting the meter and may be readily disengaged when the meter is in use.

In building the machine the mass of the block should be chosen so that the period of oscillation in the vertical direction is far below the frequency to be measured. For instance, a block weighing ten pounds suspended on four springs of two pounds per inch extension scale will have a period of 150 per minute and such a construction is suitable for measuring vibrations in the neighborhood of 300 per minute and upwards.

The block and suspension members represent a pendulum the frequency of oscillation in the horizontal direction being determined by the length of the springs. It is desirable that the natural period of the block be low. A spring length of approximately five inches will give a suitably low natural period of vibration.

When the frame is clamped or bolted to a vibrating body such as a running machine it will follow the vibrating body. If the vibration is of a frequency higher than double the natural period of the block, the block will be practically unaffected by the high frequency vibrations and will be suspended practically immovably in a predetermined position in space.

The relative motion of the frame and block may then be measured. As the block is for my purpose suspended practically immovable in space the amplitude of vibration in any direction may be measured from the reference point furnished by the block. For instance, when applied to a rotating machine in a plane normal to the axis of rotation the horizontal and vertical components of the vibration may be determined.

As only the relative vibration of frame and block is to be measured the indicator may be fastened to the block with the plunger resting against the frame or conversely with the meter fastened to the frame and the plunger resting against the block. The latter construction is my preferred method.

Since the moving parts of the dial indicator themselves present a spring and mass system and as it is necessary that the indicator plunger rest against the block face at all times the natural frequency of the indicator should be above the frequency of the measured vibration. The dial indicators known to the art have a frequency of about 2200 per minute. The natural frequency of the indicator mechanism may be increased by utilizing a stronger spring element or by lightening the mass of the moving parts.

In using the meter a bolt of the machine to be tested is selected such that when the bolt is removed, inserted in the opening 3 of the lug 2 and tightened down on the lug, the base of the vibrometer is level. The adjusting screws 9, 10, 11 and 12 are adjusted until the block is level and is properly positioned with regard to the frame, the indicators 22 and 36 are set so that their respective plungers rest on the surface 21 and the side of the block 52. When the machine is running the indicator needle will move over an arc of the dial surface the amplitude of which arc is dependent upon the degree of vibration of the frame of the vibrometer and thus the degree of vibration of the running machine. The movement and stopping points of the needle are readily discernable and the scale divisions over which the needle moves are a direct index of the degree of vibration of the machine.

Although I have described a specific modification of my invention I do not wish to be limited thereto since various modifications, such as positioning the indicators at other points so that vibration in directions other than vertical and horizontal may be measured, may be made without departing from the spirit and scope of my invention as set forth in the appended claims.

I claim as my invention:

1. A system for suspending a body in a predetermined position comprising a plurality of spring tension members for suspending the body, a plurality of spring compression members for limiting motion of the body in a horizontal plane and a plurality of friction producing members for damping the low frequency vibrations of the body.

2. A system for suspending a body in a predetermined position comprising a frame member, a plurality of spring tension suspension members for suspending the body, means for measuring relative motion between the frame and suspended body a plurality of spring members for limiting motion of the body in a horizontal plane and a plurality of spring members for exerting friction between the body and the frame and thereby damping the vibrations of the body, whereby the body is suspended so that relative motion between the suspended body and a moving body may be measured.

3. A vibration meter comprising a suspension frame member, a member suspended therefrom, and a vibration dampener comprising a plurality of spring members supported by the frame member and slidably engaging said suspended member, whereby the low frequency oscillation of the suspended member is materially decreased.

4. A vibrometer comprising a hollow frame member having openings in the side walls thereof, a body having threaded openings in the sides thereof suspended for limited oscillation in all directions within the hollow frame member, means for indicating the relative motion between the frame member and suspended body, and a locking means for holding the suspended body in fixed relation with the frame member, comprising bolts passing through the openings in the frame and adapted to be removably threaded into the threaded openings in the body.

5. In a vibrometer comprising a frame member, suspension members secured to the frame, a body suspended for oscillation from the suspension members and having threaded depressions in its horizontally opposed faces, means for indicating the relative motion between the frame member and suspended body, and a locking means comprising bolts positioned in the frame member and adapted to removably engage the threaded depressions in the body for preventing oscillation of the body when desired.

6. A system for suspending a body in a predetermined position comprising a plurality of spring tension members for suspending the body, a plurality of spring members for limiting motion of the body in a horizontal plane and friction producing members for damping the low frequency vibrations of the body.

7. In a means for measuring vibration in both a vertical and a horizontal plane, a supporting frame, a relatively heavy body, and elongated, vertically-yieldable, spring members in tension fastened to the frame and the body for yieldingly supporting it, the length and resilient characteristics of the spring members and the mass of the body being such that the body is permitted to swing freely as a pendulum at a natural frequency well below the frequencies to be measured in a horizontal plane and has a natural period of oscillation in a vertical direction well below the frequencies to be measured in a vertical plane.

In testimony whereof, I have hereunto subscribed my name this 22 day of December 1926.

GEORGE B. KARELITZ.